United States Patent
Suman et al.

(10) Patent No.: US 8,447,860 B2
(45) Date of Patent: May 21, 2013

(54) STORAGE AREA NETWORK WITH TARGET SIDE RECOGNITION AND ROUTING TABLE UPLOAD

(75) Inventors: Daniel E. Suman, Chapel Hill, NC (US); Eric R. Schott, Epsom, NH (US); Lazarus J. Vekiarides, West Roxbury, MA (US); Neil A. Swinton, Northborough, MA (US)

(73) Assignee: Dell Products L.P., Round Rock, TX (US)

( * ) Notice: Subject to any disclaimer, the term of this patent is extended or adjusted under 35 U.S.C. 154(b) by 558 days.

(21) Appl. No.: 12/215,194

(22) Filed: Jun. 25, 2008

(65) Prior Publication Data

US 2009/0019157 A1 Jan. 15, 2009

Related U.S. Application Data

(60) Provisional application No. 60/937,058, filed on Jun. 25, 2007.

(51) Int. Cl.
*G06F 15/16* (2006.01)
*G06F 12/00* (2006.01)

(52) U.S. Cl.
USPC .......................................... 709/226; 709/250

(58) Field of Classification Search .................. 709/203, 709/217, 223–229, 238, 250
See application file for complete search history.

(56) References Cited

U.S. PATENT DOCUMENTS

| 7,206,860 | B2 | 4/2007 | Murakami et al. | |
|---|---|---|---|---|
| 7,496,745 | B1 * | 2/2009 | Lok et al. | 713/2 |
| 2005/0283545 | A1 | 12/2005 | Zur et al. | |
| 2006/0277363 | A1 | 12/2006 | Qiu et al. | |
| 2006/0277383 | A1 | 12/2006 | Hayden et al. | |
| 2009/0187645 | A1 * | 7/2009 | Hayden et al. | 709/220 |

OTHER PUBLICATIONS

International Search Report, PCT/US2008/07911, dated Oct. 1, 2008.
Notification Concerning Transmittal of International Preliminary Report on Patentability (Chapter 1 of the Patent Cooperation Treaty) mailed Jan. 14, 2010 for PCT/US2008/007911, 5 pages.

* cited by examiner

*Primary Examiner* — Zarni Maung
(74) *Attorney, Agent, or Firm* — Hamilton, Brook, Smith & Reynolds, P.C.

(57) ABSTRACT

A network of data processors for providing access to a resource, such as implemented a Storage Area Network that uses iSCSI and Microsoft MPIO-based network communication protocols. In preferred embodiments, the system or method uses (a) target-side consideration of MPIO disk structures, such as by having iSCSI initiators in from iSCSI targets via an iSCSI session object that is settable by a service action; and/or (b) uploading of routing tables from iSCSI targets to iSCSI initiator(s), such as to a Device Specific Module (DSM). Implementations may also involve, in a preferred embodiment: (1) requesting that the contents of the routing table be provided from the iSCSI target side storage servers to the iSCSI initiators, and using this as one of the factors influencing path selection as performed in the MPIO DSM on the initiator side; and/or (2) transmitting information from the iSCSI initiator to the iSCSI target storage server identifying connections as belonging to the same MPIO disk, and then receiving back from the iSCSI target storage server, information about the connections that should be created, and further then having a connection load balancer on the storage server handle those connections as related connections that need to be assigned each to a different Network Interface (NIC) on the storage servers.

21 Claims, 6 Drawing Sheets

VOLUME 18

| PAGE | SERVER ID |
|---|---|
| 0 | 1 |
| 1 | 3 |
| 2 | 2 |
| 3 | 1 |
| ... | ... |
| 7942 | 1 |
| ... | ... |

| SERVER ID | SERVER |
|---|---|
| 1 | 161 |
| 2 | 162 |
| 3 | 163 |

VOLUME 17

| PAGE | SERVER ID |
|---|---|
| 0 | 1 |
| 1 | 2 |
| 2 | 2 |
| 3 | 1 |
| ... | ... |
| 9197 | 2 |
| ... | ... |

| SERVER ID | SERVER |
|---|---|
| 1 | 162 |
| 2 | 163 |

STORAGE AREA NETWORK WITH TARGET SIDE RECOGNITION AND ROUTING TABLE UPLOAD

RELATED APPLICATION(S)

This application claims the benefit of U.S. Provisional Application No. 60/937,058, filed on Jun. 25, 2007. The entire teachings of the above application(s) are incorporated herein by reference.

BACKGROUND OF THE INVENTION

This invention relates to networked data storage and in particular to target side recognition and host page routing table update, as adapted for use with Multi-Path Input Output (MPIO) or similar protocols.

As computer users rely more and more on access to remote stored information such as for databases, web applications, e-commerce, online transaction processing, and the like, the amount of remotely located information that needs to be managed and stored increases as well. The management of this information continues to provide challenges to information system administrators.

While standard disk servers are quite capable of storing data, their capacity is limited. They can also become a bottleneck if too many users try to access the same storage device at the same time. In one traditional approach to solving this problem, a large number of storage devices are attached to a single network server. A network administrator can then create a "farm" of such servers for a given application.

However, as server farms increase in size, and as companies rely more heavily on data-intensive applications, even this storage model is not completely useful. Recently, a number of vendors have collaborated to develop so-called Storage Area Network (SAN) technology. SANs provide more options for network storage, including much faster access than peripheral devices that operate as Network Attached Storage (NAS). SANs further provide flexibility to create separate networks to handle large volumes of data.

A SAN is a high speed special purpose network that interconnects different kinds of data storage devices with associated data servers on behalf of a larger network of users. A SAN can be clustered in close proximity to other computing resources, but may also extend to remote locations using wide area network technologies such as Asynchronous Transfer Mode (ATM), Fiber Channel, Internet Small Computer Systems Interface (iSCSI), and the like.

SANs typically support disk mirroring, backup and restore, archival and retrieval of archived data, data migration from one storage device to another, and the sharing of data among different servers. SANs can also incorporate subnetworks within network attached storage systems.

Certain improvements have been developed to SANs such as those described in U.S. Patent Publication No. 2004/0143637, entitled "Adaptive Storage Block Data Distribution", hereby incorporated by reference in its entirety. That design allows a storage area network administrator to control how data is stored and managed without requiring a gateway to monitor all incoming request traffic. The specific systems described in that patent application provide block level data storage services in an iSCSI environment, for example. Such a service may be employed to partition the available data storage across a plurality of equivalent servers (also called "targets" in iSCSI terminology). Each of the equivalent servers presents a similar interface to a client (called "initiators" in iSCSI terminology) and each equivalent server presents the same response to the same request from the client. Each server can also therefore communicate with other servers to notify each other when responsibility for certain data blocks is moved from one server to another server.

To maintain an understanding of the location of different data blocks across different partitions and across the different disk volumes maintained by the data block storage system, each equivalent server maintains a routing table. To this end, each equivalent server executes a routing table process that tracks the different data blocks being stored on the data block storage system and the particular equivalent server that is responsible for each data block. Changes to the routing table can be propagated by the routing table process. More particularly, since the location of the data blocks may change from time to time, routing tables need to be updated to reflect these changes.

In that system, the routing table thus shows which parts of a given volume (which page) reside on which server; each of the servers is considered a member of a particular group of servers. However, the routing tables do not necessarily list all members of a group, and tracking group membership isn't a function of the routing tables.

"MPIO" as implemented in certain versions of Microsoft™ Windows has recently emerged as a solution for providing higher availability and higher performance storage area connectivity, with the so-called multi-path I/O protocols. Multi-path Input/Output (MPIO) is a server, network, and storage configuration that allows for multiple physical connections between a host computer and target storage array. The benefit of this configuration is increased availability via multiple redundant communication paths, and improved performance by simultaneously making available for use all available paths.

Using MPIO, storage arrays can support multiple network connections and networks can be configured to support multiple physical connections. Host systems can also have multiple initiator processes. MPIO can work in many standard operating system configurations such as stand-alone systems and clusters.

Implementation of MPIO is somewhat complex, however, in that multi-path software, initiators, network elements and storage array software must all work together to provide a robust solution. A deficiency in any component can cause the solution not to meet requirements for high availability, quick recovery, and high performance operation.

MPIO solutions have historically been implemented such that each storage array vendor has a custom software solution. This creates a configuration management burden on the end user in the event that the end user desires to deploy different solutions.

Microsoft has recently developed its own Multi-Path I/O framework for use within Windows™ environments. The Microsoft MPIO architecture allows multiple storage systems to share the same MPIO solution. This framework allows, for example, multiple physical device objects to be joined together into a single functional device object called an "MPIO disk". This framework, however, requires storage vendors to create a Device Specific Module (DSM) for each product in order to "claim" physical objects as a single functional object.

In one standard MPIO solution, the server (the "iSCSI target") is capable of recognizing such MPIO disk structures. This is supported by having the DSM change iSCSI port names such as, for example, using vendor specific SCSI op codes so that all connections of an MPIO disk share a common SCSI port name.

However, there are at least several problems even with this approach:

1. This information alone cannot be used to provide load balancing among multiple physical connections. Thus, it is not possible to spread connections from a single MPIO disk over all volume members, nor is it possible to even locate two connections on the same interface of a single volume member. In other words, an attempt to load balance cannot take into account a situation where ideally one would spread the set of connections across other available disk volumes. In the event of a network failure, multiple connections might be on a common physical path that has failed, but this path cannot be deleted. It would be better to spread the available connections away from one another across all available physical paths.

2. In addition, the standard DSM does not always receive notification from the higher level MPIO process that an iSCSI connection has been reestablished. In this scenario, iSCSI reservations will not work correctly, which means that clusters will also not operate correctly.

SUMMARY OF THE INVENTION

The apparatuses and methods described herein include data operating systems that manage requests for a plurality of clients for access to a set of resources. In one embodiment, the systems comprise a plurality of servers wherein the set of resources is partitioned across the plurality of servers. The servers execute a load monitor process that is capable of communicating with the other load monitor processes for generating a measure of the client load on the overall system and the client load on each of the respective servers. The server also exchanges available path information with the client processes. More specifically, a client process also provides the server process with information concerning the connections that are servicing Multi-Path objects, so that the server can take this information into account when providing path information back to the clients.

In a preferred embodiment, such as implemented in a Storage Area Network that uses iSCSI and Microsoft MPIO-based network communication protocols, this generally includes:

(a) target-side (server) consideration of MPIO disk structures, such as by informing the target side of MPIO disk structure information via an iSCSI session object that is settable by a service action; and/or (b) uploading of routing tables from the iSCSI target side to the iSCSI initiator side, such as to a Device Specific Module (DSM) on the iSCSI initiator side.

Implementations may also involve, in preferred embodiments:

(1) requesting that the contents of the routing table be provided from the iSCSI target side storage servers to the iSCSI initiators, and using this as one of the factors influencing path selection as performed in the MPIO DSM on the initiator side; and/or (2) transmitting, from the iSCSI initiator to the iSCSI target storage server, information that identifies connections as belonging to the same MPIO disk, and then receiving back from the iSCSI target storage server information about the connections that should be created, and further then having a connection load balancer on the storage server handle those connections as related connections that need to each be assigned to a different Network Interface (NIC) on the storage servers.

Further implementation details and the advantages of these features are discussed below.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

I. Introduction

Figure 1:
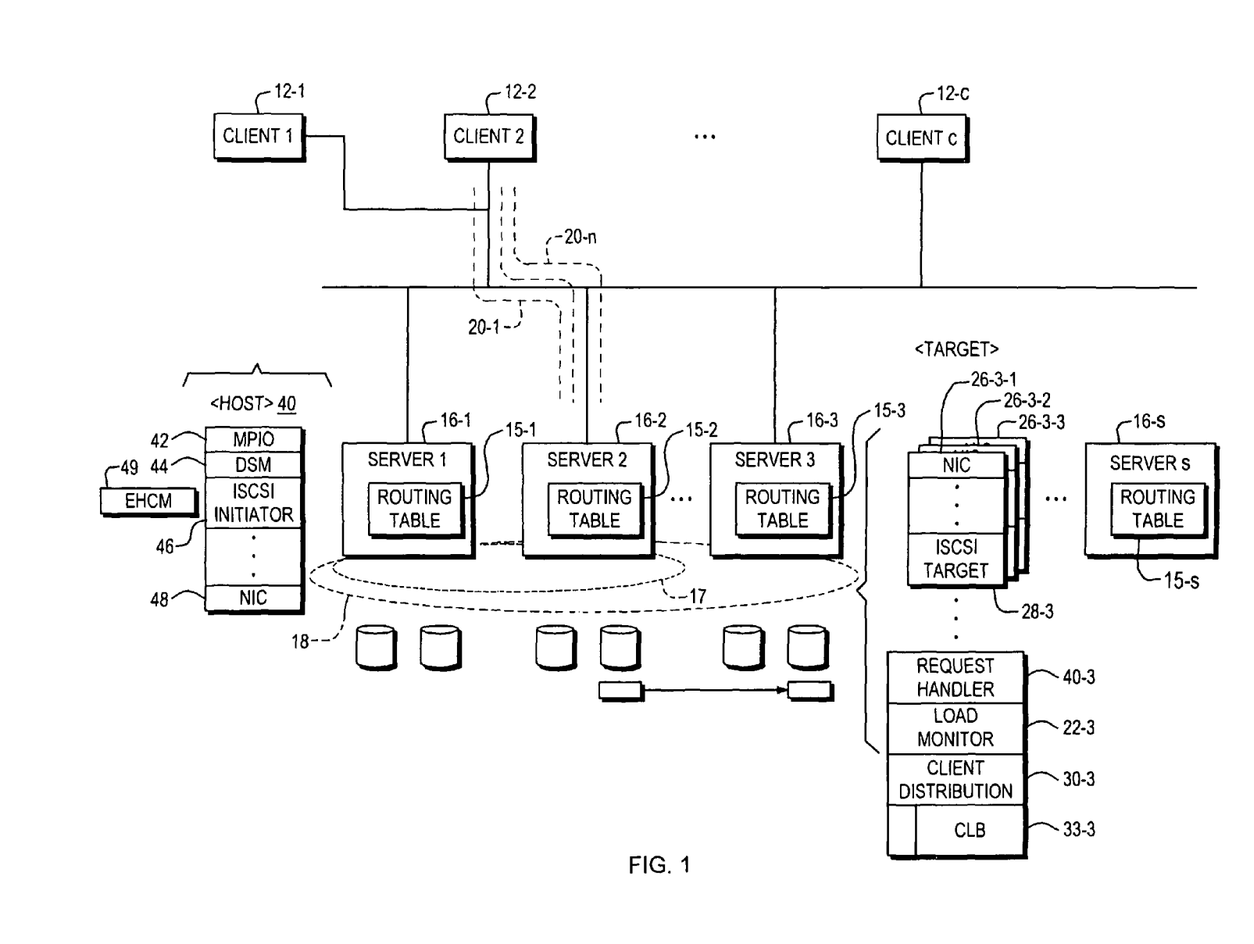
FIG. 1 is a high level diagram of an MPIO-enabled storage area network in which the invention may be implemented.

FIG. 1 illustrates an example system in which the invention may be implemented. In general, the system may be a Storage Area Network (SAN) such as that described in U.S. Patent Publication 2004/0030755 entitled "Transparent Request Routing for a Partitioned Application Server", filed Aug. 12, 2003 by Koning, et al.; U.S. Patent Publication 2004/0143637 entitled "Adaptive Storage Block Data Distribution", filed Jan. 20, 2003 by Koning, et al.; and/or U.S. Patent Publication 2004/0215792 entitled "Client Load Distribution", filed Jan. 21, 2004 by Koning, et al., each of which are hereby incorporated by reference in their entirety.

Referring to FIG. 1 particularly, one or more clients 12-1, 12-2, . . . , 12-c (collectively referred to as clients 12) are connected via a network 14, such as the Internet, an intranet, a Wide Area Network (WAN) or Local Area Network (LAN), or by other connection, to servers 16-1, 16-2, 16-3, . . . , 16-s that are part of a server group 16.

The clients 12 can be any suitable data processing system such as a Personal Computer (PC), a workstation, a handheld computing device, a wireless communication device, or any other such device equipped with a network client process capable of accessing and interacting with the server group 16 to exchange information with the server group 16. The network client 12 may be any client application that allows the user to exchange data with the server.

Multiple network interfaces are preferably provided with each client 12 and server 16 such that multiple communication paths 20-p exist between them; these multiple paths will be described in greater detail below.

The clients 12 and the server group 16 may use unsecured communication paths for accessing services at the remote server group 16. To add security to such an arrangement, the clients and servers can employ any known security group mechanism, such as a Netscape Secured Socket Layer (SSL).

In a preferred embodiment, the hosts and targets rely on storage network communication protocols, preferably iSCSI running over TCP/IP, that support multiple communication paths 20-p. Thus, each client 12 preferably also includes a multipath process such as Microsoft™ Multi-Path Input Output (MPIO) 42, a Device Specific Module (DSM) process 44, an iSCSI initiator process 46, and a network stack such as provided by one or more TCP/IP network interfaces (NICs) 48-1, . . . , 48-m. The clients 12 will also sometimes be referred to herein as iSCSI initiators, and the servers will sometimes be referred to as iSCSI targets.

Each server 16-1, 16-12 and 16-3 may comprise a commercially available server platform, such as a Sun Sparc™ system running a version of the Unix operating system. Each server 16 may also include other software components that extend their operation to accomplish the transactions described herein, and the architecture of the servers may vary according to the application.

For example, each server 16 may have built-in extensions, typically referred to as modules, to allow the servers 16 to perform the operations described below. Or servers 16 may have access to a directory of executable files, each of which may be employed for performing the operations, or parts of the operations described below. Certain such modules of interest to the present invention, as depicted in FIG. 1, are an iSCSI target process 28-3, and one or more TCP/IP network interface modules (NICs) 26-3.

Further, in other embodiments, the servers 16-1, 16-2 and 16-3 may employ a software architecture that builds certain of the processes described below into the server's operating system, into a device driver, or into a software process that operates on a peripheral device, such as a tape library, a RAID storage system or some other device. In any case, it will be understood by those of ordinary skill in the art that the systems and methods described herein may be realized through many different embodiments, and practices, and that the particular embodiment and practice employed will vary as a function of the application of interest and all these embodiments and practices fall within the scope hereof.

In operation, the clients 12 will have need to access the resources partitioned across the server group 16. Accordingly, each of the clients 12 will send requests to the server group 16. In a typical operation, one of the clients 12-2 will contact one of the servers, for example server 16-2, in the group 16 to access a resource, such as a data block, page, file, database, application, or other resource. The contacted server 16-2 itself may not hold or have control over the entire requested resource. To address this, the server group 16 is configured to make the partitioned resources available to the client 12. For illustration, the diagram shows two resources, one resource 18 that is partitioned over all three servers, servers 16-1, 16-2, 16-3, and another resource 17 that is partitioned over only two servers 16-1, 16-2. In the example application of the server group 16 being a block data storage system, each resource 17 and 18 may be a partitioned block data volume. The resources spread over the several servers 16 can be directories, individual files within a directory, or even blocks within a file.

Other partitioned services can be contemplated. For example, it may be possible to partition a database in an analogous fashion or to provide a distributed file system, or a distributed or partitioned server that supports applications being delivered over the Internet. In general, the approach can be applied to any service where a client request can be interpreted as a request for a piece of the total resource, and operations on the pieces do not require global coordination among all the pieces.

In the embodiment of FIG. 1, the server group 16 provides a block data storage service that may operate as a Storage Area Network (SAN) comprised of a plurality of equivalent servers, servers 16-1, 16-2 and 16-3. Each of the servers 16-1, 16-2 and 16-3 may support one or more portions of the partitioned block data volumes 18 and 17. In the depicted system 10, there are two data volumes and three servers, however there is no specific limit on the number of servers. Similarly, there is no specific limit on the number of resources or data volumes. Moreover, each data volume may be contained entirely on a single server, or it may be partitioned over several servers, either all of the servers in the server group, or a subset of the server group. In practice, there may of course be limits due to implementation considerations, for example the amount of memory available in the servers 16-1, 16-2 and 16-3 or the computational limitations of the servers 16-1, 16-2 and 16-3. Moreover, the grouping itself, i.e., deciding which servers will comprise a group 16, may in one embodiment comprise an administrative decision. In a typical scenario, a group might at first contain only a few servers, perhaps only one. The system would add servers to a group as needed to obtain the level of service required. Increasing servers creates more space (memory, disk storage) for resources that are stored, more CPU processing capacity to act on the client requests, and more network capacity (network interfaces) to carry the requests and responses from and to the clients. It will be appreciated by those of skill in the art that the systems described herein are readily scaled to address increased client demands by adding additional servers into the group 16.

II. Load Distribution in General

The clients typically act independently, and as such, the client load placed on the server group 16 will vary over time. As client demand for access to resources varies, the system can redistribute client load to take better advantage of the available resources in server group 16. To this end, in one embodiment the system 10 comprises a plurality of equivalent servers. As client requests are delivered to the equivalent servers, the equivalent servers coordinate among themselves to generate a measure of system load and to generate a measure of the client load of each of the equivalent servers. In a preferred practice, this coordinating is done in a manner that is transparent to the clients 12, so that the clients 12 see only requests and responses traveling between the clients 12 and server group 16.

In a preferred embodiment, a given client 12 connecting to a particular server 16-1 will see the resources managed by the entire server group 16 as if the group were a single server 16-1. The client 12 is not aware that the server group 16 is actually constructed out of a potentially large number of servers 16-1, 16-2, . . . 16-s, nor is it aware of the partitioning of the block data volumes 17, 18 over the several servers 16-1, 16-2, . . . 16-s. As a result, the exact number of servers and the manner in which resources are partitioned among the servers 16 may be changed without affecting the network environment seen by the client 12.

Continuing to referring to FIG. 1, in the partitioned server group 16, any volume may be spread over any number of servers within the group 16. In the example mentioned above, one volume 17 (resource 1) is spread over two servers 16-1, 16-2, whereas another volume 18 (resource 2) may be spread over three servers 16-1, 16-2, 16-3. Advantageously, the respective volumes are arranged in fixed-size groups of blocks, also referred to as "pages," wherein an exemplary page contains 8192 blocks. Other suitable page sizes may be employed.

Each server in the group 16 preferably contains a corresponding routing table 15 for each volume, with the routing table 15 identifying the server on which a specific page of a specific volume can be found. For example, when the server 16-1 receives a request from a client 12 for partitioned "volume 18, block 93847", the server 16-1 calculates the page number (page number 11 in this example for a page size of 8192) by dividing the requested block number by the page size and looks up, in its respective routing table 15-1, the number of the server that contains the requested page number 11.

If server 16-3 contains page number 11, the request is forwarded to server 16-3, which reads the data and returns the data to the server 16-1. Server 16-1 then sends the requested data to the client 12. In other words, the response is always returned to the client 12 via the same server 16-1 that received the request from the client 12. It is therefore transparent to the client 12 to which server 16-1, 16-2, 16-3 it is actually connected. Instead, the client only "sees" the server group 16 and requests the resources of the server group 16.

It should be noted here that the routing of client requests is done separately for each request. This allows portions of a resource to exist at different servers. It also allows resources, or portions thereof, to be moved while the client is connected to the server group 16. To accomplish that, the routing tables 15-1, 15-2, 15-3, . . . , 15-s are updated as necessary and subsequent client requests are forwarded to the new server now responsible for handling that request.

At least for a given resource 17, the routing tables 15 are identical. For example, entries in routing tables 15-1 and 15-2 for servers 16-1 and 16-2 are identical for resource 17.

This system is therefore different from a "redirect" mechanism, wherein a server 16 determines that it is unable to handle requests from a client, and redirects the client to the server that can do so. The client then would have to establish a new connection to another server. Since establishing a connection is relatively inefficient, the redirect mechanism is ill-suited for handling frequent requests.

As shown in FIG. 1, an example server 16-3 also includes one or more network interfaces (NICs) 26-3-1, 26-3-2, . . . 26-3-q, an iSCSI target process 28-3, a request handling process 40-3, a load monitor process 22-3, and client distribution process 30-3. The request handling process 40-3 handles client requests in the partitioned server 16 environment by checking if the requested resource is present at an initial server that received the request from the client 12. It then examines its routing table 15-3, to determine at which server the requested resource is located. If the requested resource is present at the initial server 16-3, the initial server 16-3 returns the requested resource to the client 12. Conversely, if the requested resource is not present at the initial server 16-3, the initial server will use data from its routing table 15-3 to determine which server actually holds the resource requested by the client. The request is then forwarded to the server that holds the requested resource, which then returns the requested resource to the initial server. The process request handling process 40-3 then has the initial server forward the requested resource to the client 12.

Figure 2:
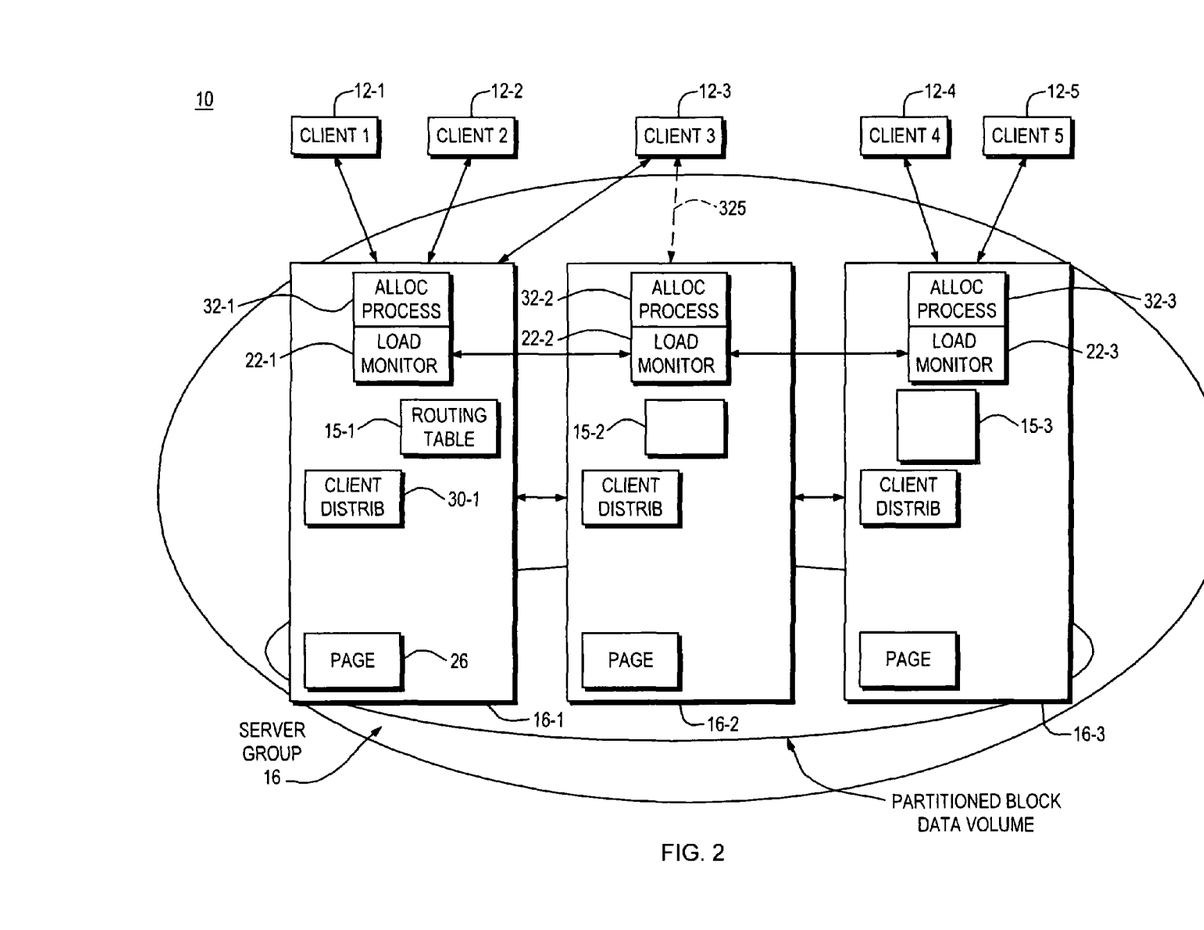
FIG. 2 illustrates more detail of a target side process used with the network of FIG. 1.

Turning now to FIG. 2, one particular embodiment of a block data service system 10 is shown in more detail. Specifically, FIG. 2 depicts a system 10 wherein the client 12 communicates with the server group 16. The server group 16 includes three servers, server 16-1, 16-2 and 16-3. Each server includes a routing table depicted as routing tables 15-1, 15-2 and 15-3 (which correspond to routing tables 15 in FIG. 1). In addition to the routing tables, each of the equivalent servers 16-1, 16-2 and 16-3 include a load monitor process, 22-1, 22-2 and 22-3 respectively.

Each of the servers 16-1, 16-2, 16-3 communicate with other servers in their respective group 16, such as to share routing tables 15-1, 15-2 and 15-3. As described above, the routing tables 15 track which of the individual equivalent servers is responsible for a particular resource maintained by the server group 16. In the embodiment shown, the server group 16 may be a SAN, or part of a SAN, wherein each of the equivalent servers 16-1, 16-2 and 16-3 has an individual IP address that may be employed by a client 12 for accessing that particular equivalent server on the SAN.

As further described above, each of the equivalent servers 16-1, 16-2 and 16-3 is capable of providing the same response to the same request from a client 12. To that end, the routing tables of the individual equivalent 16-1, 16-2 and 16-3 coordinate with each other to provide a global database of the different resources. In exemplary embodiments, the servers include data blocks, pages, or other organizations of data blocks, and the individual equivalent servers that are responsible for those respective data blocks, pages, files or other storage organization.

Figure 3:
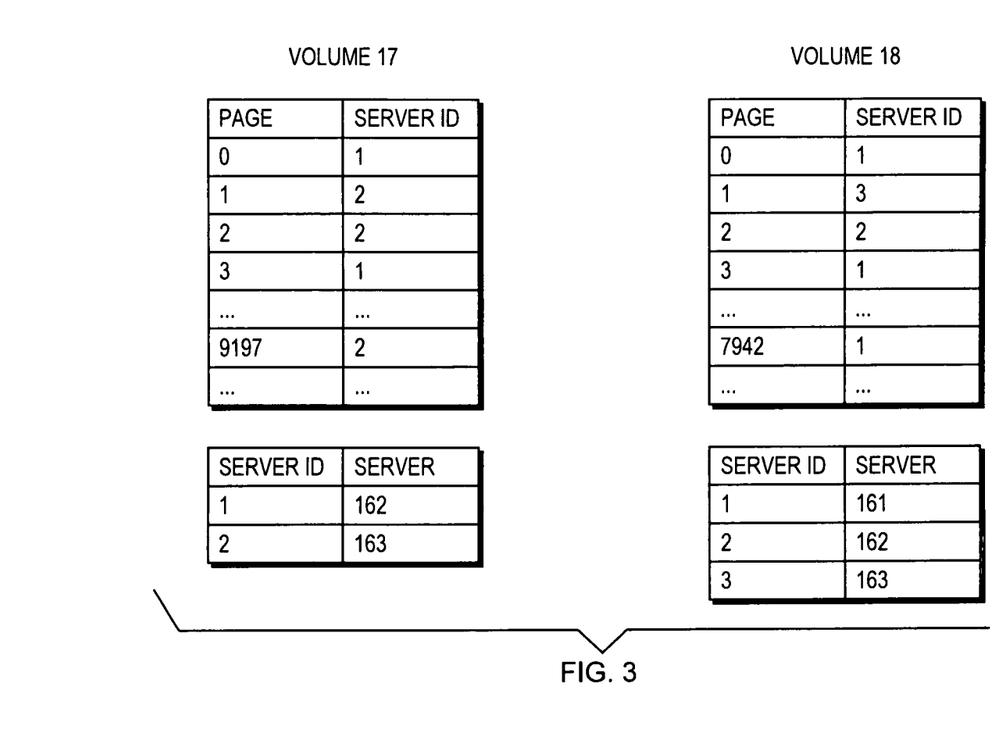
FIG. 3 illustrates a routing table.

FIG. 3 depicts an example routing table 15. Each routing table 15 in the server group 16, such as table 15-1, includes an identifier (Server ID) for each of the equivalent servers 16-1, 16-2 and 16-3 that support the partitioned data block storage service. Additionally, each of the routing tables 15 includes information that identifies those data blocks and pages associated with each of the respective equivalent servers. In the embodiment depicted by FIG. 3, the equivalent servers support two partitioned volumes. A first one of the volumes, Volume 18, is distributed or partitioned across all three equivalent servers 16-1, 16-2 and 16-3. The second partitioned volume, Volume 17, is partitioned across two of the equivalent servers, servers 16-2 and 16-3 respectively.

The routing tables 15 may be employed by the system 10 to balance client load across the available servers. Specifically load monitor processes 22-1, 22-2 and 22-3 each observe the request patterns arriving at their respective equivalent servers to determine to determine whether patterns or requests from clients 12 are being forwarded to the SAN and whether these patterns can be served more efficiently or reliably by a different arrangement of client connections to the several servers. In one embodiment, the load monitor processes 22-1, 22-2 and 22-3 monitor client requests coming to their respective equivalent servers.

In one embodiment, the load monitor processes 22 each build a table representative of the different requests that have been seen by the individual request monitor processes. Each of the load monitor processes 22-1, 22-2 and 22-3 are capable of communicating between themselves for the purpose of building a global database of requests seen by each of the equivalent servers. Accordingly, in this embodiment, each of the load monitor processes is capable of integrating request data from each of the equivalent servers 16-1, 16-2 and 16-3 to generate a global request database representative of the request traffic seen by the entire block data storage system 10. In one embodiment, this global request database is made available to the client distribution processes 30-1, 30-2 and 30-3 for their use in determining whether a more efficient or reliable arrangement of client connections is available.

FIG. 2 also illustrates that the server group 16 may be capable of redistributing client load by having client 12-3, which was originally connected to (communicating with) server 16-1, redistributed to server 16-2. To this end, FIG. 2 depicts an initial condition wherein the server 16-1 is communicating with clients 12-1, 12-2, and 12-3. This is depicted by the bidirectional arrows coupling the server 16-1 to the respective clients 12-1, 12-2, and 12-3. As further shown in an initial condition, clients 12-4 and 12E are communicating with server 16-3 and no client (during the initial condition) is communicating with server 16-2. Accordingly, during this initial condition, server 16-1 is servicing requests from three clients, clients 12-1, 12-2, and 12-3. Server 16-2 is not servicing or responding to requests from any of the clients.

Accordingly, in this initial condition the server group 16 may determine that server 16-1 is overly burdened or asset constrained. This determination may result from an analysis that server 16-1 is overly utilized given the assets it has available. For example, it could be that the server 16-1 has limited memory and that the requests being generated by clients 12-1, 12-2, and 12-3 have overburdened the memory assets available to server 16-1. Thus, server 16-1 may be responding to client requests at a level of performance that is below an acceptable limit. Alternatively, it may be determined that server 16-1, although performing and responding to client requests at an acceptable level, is overly burdened with respect to the client load (or bandwidth) being carried by server 16-2. Accordingly, the client distribution process 30 of the server group 16 may make a determination that overall efficiency may be improved by redistributing client load from its initial condition to one wherein server 16-2 services requests from client 12-3.

Considerations that drive the connection load balancing decision may vary. One example may be the desire to reduce routing: for example, if one server is the destination of a significantly larger fraction of requests than the others on which portions of the resource (e.g., volume) resides, it may be advantageous to move the connection to that server. Another example may be to balance server communications load: if the total communications load on a server is substantially greater than that on some other server, it may be useful to move some of the connections from the highly loaded server to the lightly loaded one, and balancing of resource access load (e.g., disk I/O load)—as in preceding example but for disk I/O load rather than communication load. This is an optimization process that involves multiple dimensions, and the specific decisions made for a given set of measurements may depend on administrative policies, historical data about client activity, the capabilities of the various servers and network components, etc.

To this end, FIG. 2 depicts this redistribution of client load by illustrating a connection 325 (depicted by a dotted bi-directional arrow) between client 12-3 and server 16-2. It will be understood that after redistribution of the client load, the communication path between the client 12-3 and server 16-1 may terminate.

Balancing of client load is also applicable to new connections from new clients. When a client 12-6 determines that it needs to access the resources provided by server group 16, it establishes an initial connection to that group 16. This connection will terminate at one of the servers 16-1, 16-2, or 16-3. Since the group appears as a single system to the client, it will not be aware of the distinction between the addresses for 16-1, 16-2, and 16-3, and therefore the choice of connection endpoint may be random, round robin, or fixed, it will not be responsive to the current load patterns among the servers in group 16.

When this initial client connection is received, the receiving server can at that time make a client load balancing decision. If this is done, the result may be that a more appropriate server is chosen to terminate the new connection, and the client connection is moved accordingly. The load balancing decision in this case may be based on the general level of loading at the various servers, the specific category of resource requested by the client 12-6 when it established the connection, historic data available to the load monitors in the server group 16 relating to previous access patterns from server 12-6, policy parameters established by the administrator of server group 16, etc.

Another consideration in handling initial client connections is the distribution of the requested resource. As stated earlier, a given resource may be distributed over a proper subset of the server group. If so, it may happen that the server initially picked by client 12-6 for its connection serves no part of the requested resource. While it is possible to accept such a connection, it is not a particularly efficient arrangement because in that case all requests from the client, not merely a fraction of them, will require forwarding. For this reason it is useful to choose the server for the initial client connection only from among the subset of servers in server group 16 that actually serve at least some portion of the resource requested by new client 12-6.

This decision can be made efficiently by the introduction of a second routing database. The first routing database 15 described earlier specifies the precise location of each separately moveable portion of the resource of interest. Copies of that first routing database's need to be available at each server that terminates a client connection on which that client is requesting access to the resource in question. However, the second "connection balancing" routing database simply states for a given resource (as a whole) which servers among those in server group 16 currently provide some portion of that resource. For example, a connection balancing routing database describing the resource arrangement shown in FIG. 1 consists of two entries: one for resource 17 that lists servers 16-2 and 16-3, and one for resource 18 that lists servers 16-1, 16-2, and 16-3. The servers that participate in the volume have the entire routing table for that volume as shown on FIG. 3, while non-participating servers have only the bottom section of the depicted routing table. In a partitioning of the two volumes as shown in FIG. 1, this means that server 16-1 has the bottom left table shown in FIG. 3 and both of the tables on the right side of the figure, while servers 16-1 and 16-2 have all four tables depicted.

III. Connection Load Balancing with Target Side Recognition of MPIO and Routing Table Upload As alluded to previously in connection with FIG. 1, the client 12 may preferably be an iSCSI compatible host 40 running Microsoft's MPIO 42, a DSM 44, and iSCSI initiator 46 processes. MPIO solutions use redundant physical network components—such as multiple network interfaces 26, cables, and switches—to create multiple logical and physical paths between each client 12 (host) and the servers (storage devices) 16. For example, a given server 16-3 may actually have three NICs 26-3-1, 26-3-3 and 26-3-3. In addition to being used for further load balancing, in the event that one or more component fails thereby causing the path to fail, logic implemented by the MPIO module 42 uses an alternate I/O path so that applications can still access their data. Multiple physical network connections 20-1, 20-2 . . . , 20-n are therefore provided between a given host 40 (on client 12-1) and a given server 16-2.

The additional connections can be provided in a secure environment in various ways. In a preferred embodiment, this can be done using the Diffie-Hellman (DH) algorithm, avoiding the need to manage host passwords and the like. For example, once the user logs in using host-side security protocols, the additional connections are installed as secure channels using known DH protocols in IPsec. Thus an ideal solution to routing requests also distributes the requests over the available multiple MPIO connections as well.

I. Target Side Recognition of MPIO Disks

It is therefore desirable to provide an enhancement to previous MPIO solutions by including a session object in a process running in an iSCSI initiator 12. The session object can carry identifiers for MPIO structures to the iSCSI targets 16. In one embodiment the MPIO identifiers can be settable by a new service action of a iSCSI vendor specific op code.

In a preferred embodiment, informing the target side of the MPIO disk structure can involve cooperation between various modules on the client (iSCSI initiator) 12, such as the kernel DSM 44 and a specific Windows service (EHCM 49), and other modules on the server (iSCSI target 16), specifically a Connection Load Balancer (CLB) 33 portion of client distribution process 30-3. In particular, a dialog is established between the host EHCM process and the CLB in the target. Thus, the target need not automatically "recognize" MPIO disk structures, but rather, it is preferably specifically informed of the existence of MPIO disk structures. In one implementation, this can occur as follows.

The EHCM module 49 server in the client sends a job request, (IOCTL_EQLDSM_EHCM_WORK_RQST ioctl)

to the DSM 44 on the host. The response tells the EHCM 49 what type of job is required. With each job request response, the DSM kernel can also return the time at which the EHCM should send the next request.

Figure 4:
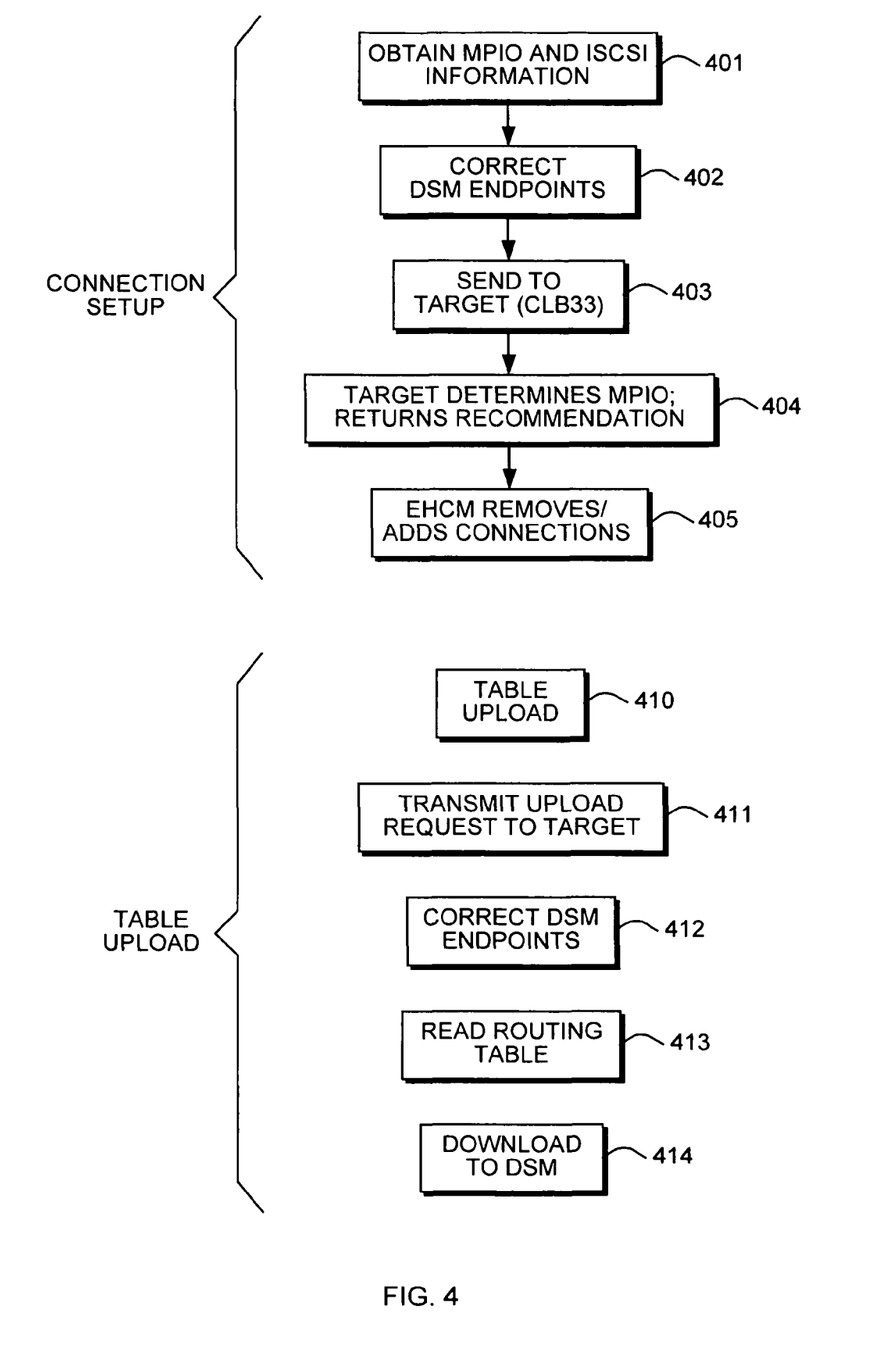
FIG. 4 illustrates steps performed by an initiator side client.

Two jobs on the client side are relevant here:

EqlDsmIoctlJob::CONNECTION_SETUP and
EqlDsmIoctlJob::TABLE_UPLOAD;

each of which are now described in more detail in connection with FIG. 4.

EqlDsmIoctlJob::CONNECTION_SETUP

Step 401: Additional MPIO and iSCSI information is obtained from various userspace sources.

Step 402: Using a particular service action of a vendor-specific opcode (such as op code 20h), any necessary corrections are made to the DSM endpoint information (for example, if iSCSI has moved a connection).

Step 403: All the information is then sent to the target 16 (the CLB 33).

Step 404: The target 16 determines an optimal MPIO configuration and sends its recommendations back to the client 12.

Step 405: The EHCM 49 (which is in client 12 userspace, of course) removes and adds connections as appropriate.

EqlDsmIoctlJob::TABLE_UPLOAD

Step 410: A table upload request is transmitted to the target.

Step 411: Corrections are then made to the DSM endpoint information as required (as above).

Step 412: The entire routing table is then read (e.g., in 64 KB chunks).

Step 413: The routing table is downloaded to the DSM 44 using the ioctl

IOCTL_EQLDSM_ROUTING_TABLE_UPLOAD.

Figure 5:
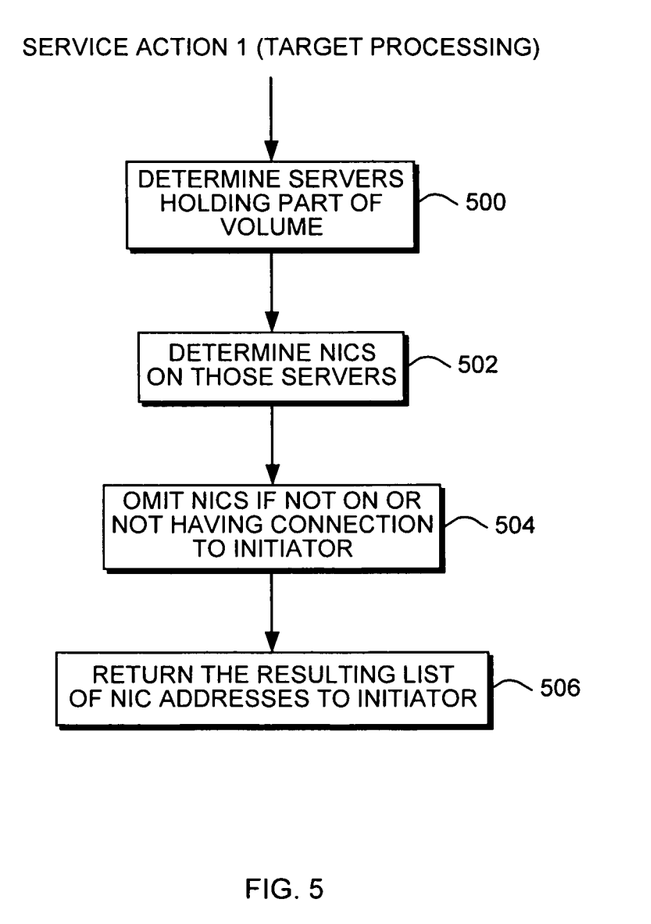
FIG. 5 illustrates a sequence of steps performed by a target side server.

FIG. 5 illustrates more detail of the corresponding response process on the target side, which is to return TCP/IP endpoints of connections to be used by the iSCSI initiator. Initiated by a service action on a vendor specific op code, a first step 500 is to determine which servers 16 are holding part of the requested resource, such as by consulting the routing table(s) 15. Next, in step 502, a determination is made as to which NICs 26-3 are actually present on those corresponding servers 16. In step 504, any of those NICs not presently operating, or not available for assignment to the initiator in question (according to the CLB process 33-3) are omitted from the list. Finally, in step 406, the resulting list is returned to the initiator 12.

By returning a list of connections (TCP/IP address pairs) that should be established, then there is an implication back to the initiator 12 that any other existing connections should be terminated.

In this way, the initiator 12 is informed of allowable connection information, without having to be informed of the information in tables 15 that the servers 16 use among themselves. The initiator 12 can then use whatever algorithm is suitable (e.g., round robin, least-queue-depth, lowest-latency, etc.) to manage the connections it has been told about.

Figure 6:
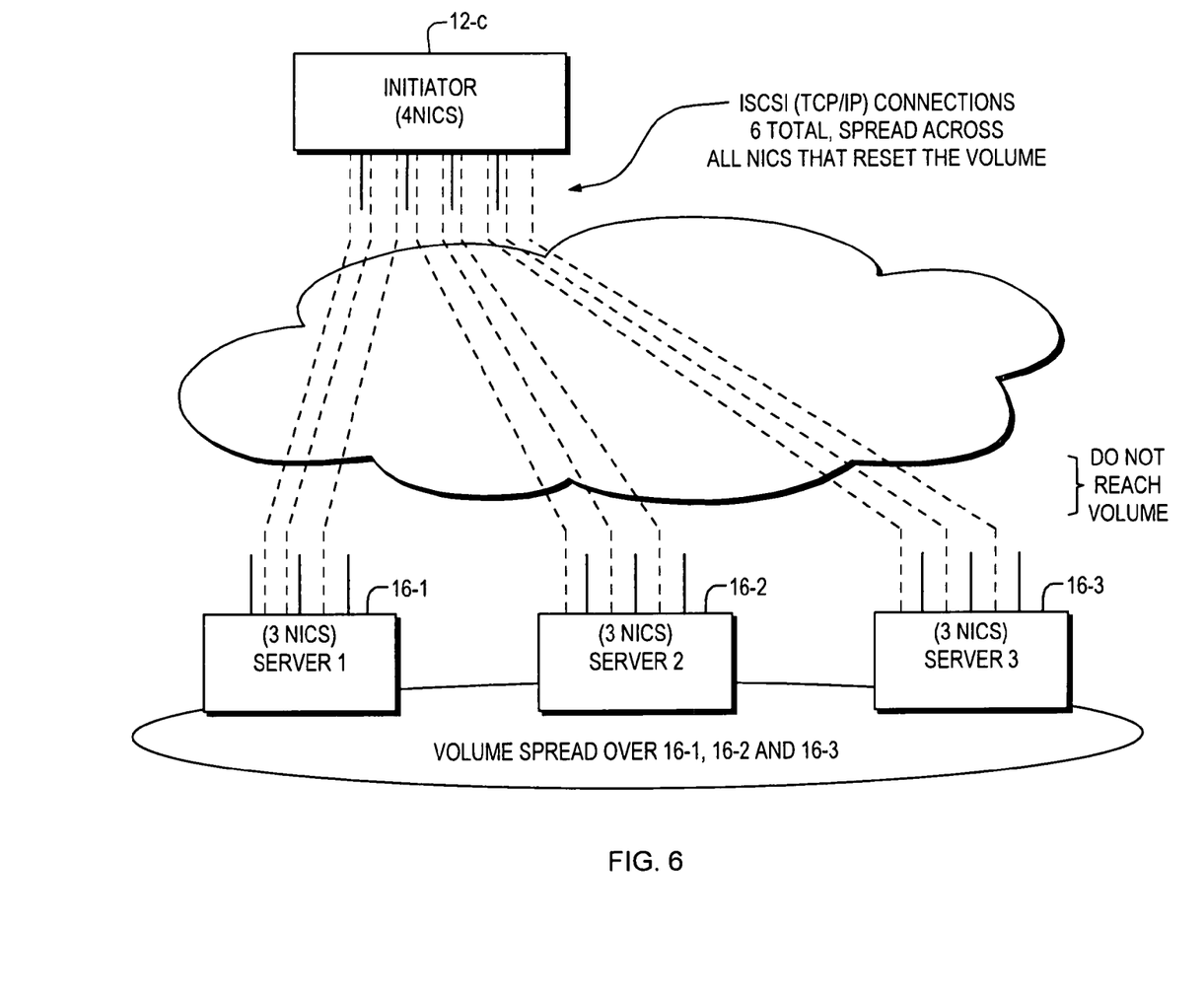
FIG. 6 illustrates handling of multiple connections.

FIG. 6 shows the result. Here, a given iSCSI initiator 12 can now make use of four (4) physical NICs without knowing further details of the available three (3) servers in the group 16 at the iSCSI target that each have three (3) available NICs, for a total of nine (9) physical connections there. The MPIO process at the initiator 12 can now simply balance the load among these available connections of which it has been informed.

It can now be understood that the following advantages are provided by this implementation.

1. Information about MPIO disks can now be used by the connection load balancer (CLB 33) component, which is logically a function of the group 16. Thus, when the connection process queries the network protocol stack 26 on each given storage server 16 for information, it can return [connection, MPIO identifier] pairs. Since the EHCM 49 now transmits the MPIO configuration information directly to the CL33, the rest of the system need not be aware of MPIO identifier information. In other words, the connection load balancer is now also aware that a set of connections are related and that they should be spread across several available physical connections 20, away from each other. This can be implemented by making the connections go to different storage arrays (different servers 16) or to different NICs 26 servicing a given server 16.

2. When a connection is closed by initiator 12, it can now notify other sessions that correspond to the same MPIO disk and those sessions can return a vendor specific check condition back to the DSM 44. This provides the DSM 44 with a reliable notification mechanism for connection changes.

II. Uploading of Routing Table

The DSM model, as specified in Microsoft's MPIO, allows a hardware vendor to perform device specific load balancing. With the prior art, this can entail, for example, routing a iSCSI command to the least busy NIC 26. In that case, one thing that can be done is to route commands directly to the server 16 where the requested data is located, rather than forcing the iSCSI target side (that is, the servers 16) to do the routing among themselves as explained above.

This approach requires uploading a routing table to the DSM 44 process in the host, preferably as demanded by the DSM 44. This can be periodic or whenever changes are made. This is an inexpensive process since the routing table is typically quite small. With this approach, the DSM 44 does not need to actually balance the connection since it does not have necessary per-interface information. The DSM 44 can now, create at least as many connections as there are volume members. It is therefore always possible to route client side but determine the best target side endpoint.

Once a connection is established, the DSM 44 can use a service action (vendor specific op code 20h and service action 03h as described below) to assess the situation, but that may involve target side routing. There may be load balancing considerations or network considerations, i.e., sub-network considerations, that are more important than doing all routing on the client 12.

The new target functionality can be implemented as three new service actions for vender specific SCSI op code 20h, as sent from the initiator (DSM 44) to the iSCSI targets. The new target functionality can thus define three opcode 20h service actions as:

```
enum SCSI_VENDOR_SPECIFIC_20_SERVICE_ACTIONS {
  EQLCDB_SA_GET_PAGE_TABLES=0,   /* read session page
                                    tables */
  EQLCDB_SA_SET_MPIO_ID=1,       /* payload is binary uuid */
  EQLCDB_SA_GET_TCPIP_INFO=2,    /* read host/target tcp/ip
                                    port information*/
};
```

Service Action Assignments

A. Service Action 0

This is the standard service action implemented for op code 20h. It sends a message to the volume leader, advising it of a name change and then updates the session is iSCSI port name. This service action can remain unchanged for backward compatibility, although it is no longer used.

B. Service Action 1

In response to this service action the following actions are then taken.

1. Information concerning the connections being used for a particular MPIO object is conveyed to the target. This can be conveyed as a list of connections. However, in an optional configuration, rather than provide such a list, a Globally Unique Identifier (GUID) can be defined and then subsequently used for each MPIO object.

2. Standard service action 0 is then run. This involves sending a message to the volume leader to let it update its tables so that it will not orphan any reservations already held by that session.

C. Service Action 2

This service action also has no input parameters. The response data is the routing table. In one embodiment, this may be a message that begins with a header giving the number of volume pages, the volume members and the storage array identifier of each volume member, with the header being followed by bit fields for each volume member. However, other formats are possible.

D. Service Action 3

This service action has no input. It returns a universal storage array identifier (UUID) of the volume member on which the connection is terminated.

In addition, the following two request/response messages are also provided between processes:

CDHKeyExchReq/CDHKeyExchRsp; and

CHostConnectionReconfigurationReq/CHostConnectionReconfigurationRsp

The first of these message pairs is used to dynamically create temporary security/login (CHAP) credentials, which are used to securely "clone" the initial iSCSI connection created directly by the user (using Diffie Hellman as alluded to above).

The second of the message pairs is how the host transmits MPIO configuration information to the target (i.e., to the CLB 33 process), and then subsequently receives instructions on how to optimally set up the MPIO connection mesh.

By sending updated routing tables to the host, the host DSM 44 can then take into account routing considerations when performing path selection.

Also, this process informs the host 12 of the number of storage servers 16 involved in providing a volume 17 or 18 (this is part of the routing data). This allows the host 12 to open at least that many connections. When it does that, the storage group recognizes that these connections all come from the same host 12 and it can now spread them over the storage servers rather than simply doing the connection load balancing separately for each connection.

More particularly, the connections are all marked as belonging to the MPIO disk, such as via the information conveyed in service action 1. This allows the connection load balancer 33 to know that they are related, and to do the balancing differently than it would otherwise. Normally, the connection load balancer 33, when presented with a set of connections to handle, would place each connection individually, since it doesn't know of or assume any relationship among the connections. As a result, depending on the current load patterns in the group, several connections may share resources (such as storage server NICs).

However, when the connection load balancer 33 is handling a set of connections all of which relate to a single MPIO disk, it can now avoid assigning them to the same NIC. This ensures that the multiple MPIO connections will not in fact share a path, which would defeat the fault tolerance and performance enhancing benefits MPIO sets is out to deliver. The MPIO client is told by the storage server (by the connection balancer) how many connections it should create, which takes into account issues such as failed interfaces. As a result it should normally be the case that the client will open as many connections as can be spread over the available interfaces and no more than that—and the connection load balancer 33 can indeed spread them that way because it knows that they all relate to the same MPIO disk.

While this invention has been particularly shown and described with references to example embodiments thereof, it will be understood by those skilled in the art that various changes in form and details may be made therein without departing from the scope of the invention encompassed by the appended claims.

What is claimed is:

1. A storage server for providing access to a partitioned resource comprising:

a plurality of client communication connections to at least one client device;

a server communication connection to two or more other storage servers, such that the storage server and the other storage servers form a server group;

a storage device for storing only a portion of the partitioned resource thereon, such that only a first portion of the partitioned resource is stored on the storage server, and such that other portions of the partitioned resource are stored on the other storage servers;

a request handler, for receiving requests for access to the partitioned resource via one of the client communication connections, and determining which portions of the partitioned resource are stored on the storage device, and which portions of the partitioned resource are stored on one or more of the other storage servers in the server group, and for retrieving at least some portions of the partitioned resource from at least one of the other servers over the server communication connection;

a load monitor, for:

determining a local load placed on the storage server;

receiving information via the server communication connections concerning a load placed on the other servers; and generating a measure of load from both the local load and the load on the other servers; and a request load distributor, responsive to the load monitor, for reallocating the first portion of the partitioned resource from the storage server to at least one of the other storage server when the measure of load indicates the storage server is over utilized;

the request handler further comprising:

a connection load balancer for, upon receipt of a request for access to the partitioned resource from a client data processor having multiple path input/output (MPIO) functionality, and the client providing, with the request, information concerning resource objects that use the MPIO functionality determining which servers in the server group are holding one or more parts of the requested resource;

determining, of those servers, which servers have two or more available connections for providing access to the partitioned resource by the client; and returning a list of such available connections that the client device may use to obtain access to the partitioned resource, and such that all of the servers in the server group do not subsequently establish connections with the client device.

2. The apparatus of claim 1 wherein the client device is an iSCSI initiator and the storage servers are iSCSI targets.

3. The apparatus of claim 2 wherein the MPIO object information is provided as part of an iSCSI session object.

4. The apparatus of claim 3 wherein the MPIO object information is provided as a settable service action in the iSCSI session object.

5. The apparatus of claim 2 wherein the set of available connections is provided as a routing table that is uploaded from the iSCSI target side storage servers to the iSCSI initiator client device.

6. The apparatus of claim 5 wherein the routing table is uploaded to a DSM module in the iSCSI initiator client.

7. The apparatus of claim 6 wherein the routing table is used to determine path selection as performed in the DSM module.

8. The apparatus of claim 2 wherein MPIO the information transmitted from the iSCSI initiator client to the iSCSI target server identifies multiple connections as belonging to a particular MPIO data volume.

9. The apparatus of claim 8 wherein the connection load balancer on the iSCSI target servers handles the identified multiple connections as related connections that are each assigned to a different Network Interface (NIC) at the iSCSI storage servers.

10. The apparatus of claim 1 additionally wherein the list of available connections is sent to a load balancer in the client device.

11. The apparatus of claim 1 wherein the list of available connections includes a list of service and destination addresses.

12. A method for operating a storage server comprising:

establishing a plurality of client communication connections to at least one client device;

establishing a server communication connection to at least two or more other storage servers, such that the storage server and the other storage servers form a server group;

storing portions of a partitioned resource by the storage server, such that only a first portion of the partitioned resource is stored by the storage server, and such that other portions of the partitioned resource are stored by the other storage servers in the server group;

handling requests for access to the partitioned resource via one of the client communication connections from the client, by determining which first portions of the partitioned resource are stored on the storage device connected to the storage server, and which other portions of the partitioned resource are stored by the other storage servers, and by responding to at least one request for access to the partitioned resource by retrieving at least some of the other portions of the partitioned resource from the other storage server over the server communication connection, and returning the first portions and the other portions of the partitioned resource to the client device over the client communication connection, such that the client does not make a direct connection to at least one of the other servers to receive the other portions of the partitioned resource;

monitoring a load on the server group by:

determining a local load placed on the storage server by the step of handling requests;

receiving information via the server communication connections concerning a load placed on the other servers; and generating a measure of server group load from both the local load on the storage server and the load on the other servers;

distributing client load, responsive to the step of generating a measure of server group load, by reallocating the portions of the partitioned resource from the storage server to the other storage server when the measure of server group load indicates the storage server is over utilized;

wherein the step of handling requests further comprises, receiving, from the client device, a request for access to the partitioned resource including;

information concerning partitioned resource objects that use Multiple Path Input/Output (MPIO) functionality;

determining which of the storage server or other server are storing one or more portions of the requested partitioned resource;

determining, of the servers that are storing one or more portions of the requested resource, which servers have two or more available connections for the client to use to access the partitioned resource using MPIO functionality; and returning, to the client, a list of the available two or more connections that the client may use to obtain access to the partitioned resource, whereby the client uses only the available connections to access the partitioned resource, without the client having further details of which servers in the server group store which portions of the partitioned resource, and such that client does not establish connections to all of the servers in the server group.

13. The method of claim 12 wherein the client is an iSCSI initiator and the servers are iSCSI targets.

14. The method of claim 13 wherein the MPIO information is provided as part of an iSCSI session object.

15. The method of claim 14 wherein the MPIO information is provided as a settable service action in the iSCSI session object.

16. The method of claim 13 wherein the step of returning a list of connections to the client further comprises:

uploading a routing table to the iSCSI initiator client that defines which connections can be used to provide access the partitioned resource.

17. The method of claim 16 wherein the routing table is uploaded to a DSM module in the iSCSI initiator client.

18. The method of claim 13 wherein the resource object information received from the iSCSI initiator client identifies multiple connections as belonging to a particular MPIO data volume.

19. The method of claim 18 additionally comprising:

handling the indicated multiple connections as related connections that are assigned each to a different Network Interface (NIC).

20. The method of claim 12 further comprising:

at the client device, using the list of available connections within an MPIO process, for determining how to balance further requests for access to the partitioned resource among the available connections.

21. The method of claim 12 wherein the list of available connections includes a list of source and destination addresses.

* * * * *